Sept. 7, 1937.　　　　O. SCHREIBER　　　2,092,225
LOCKING DEVICE
Filed May 19, 1936　　　2 Sheets-Sheet 1
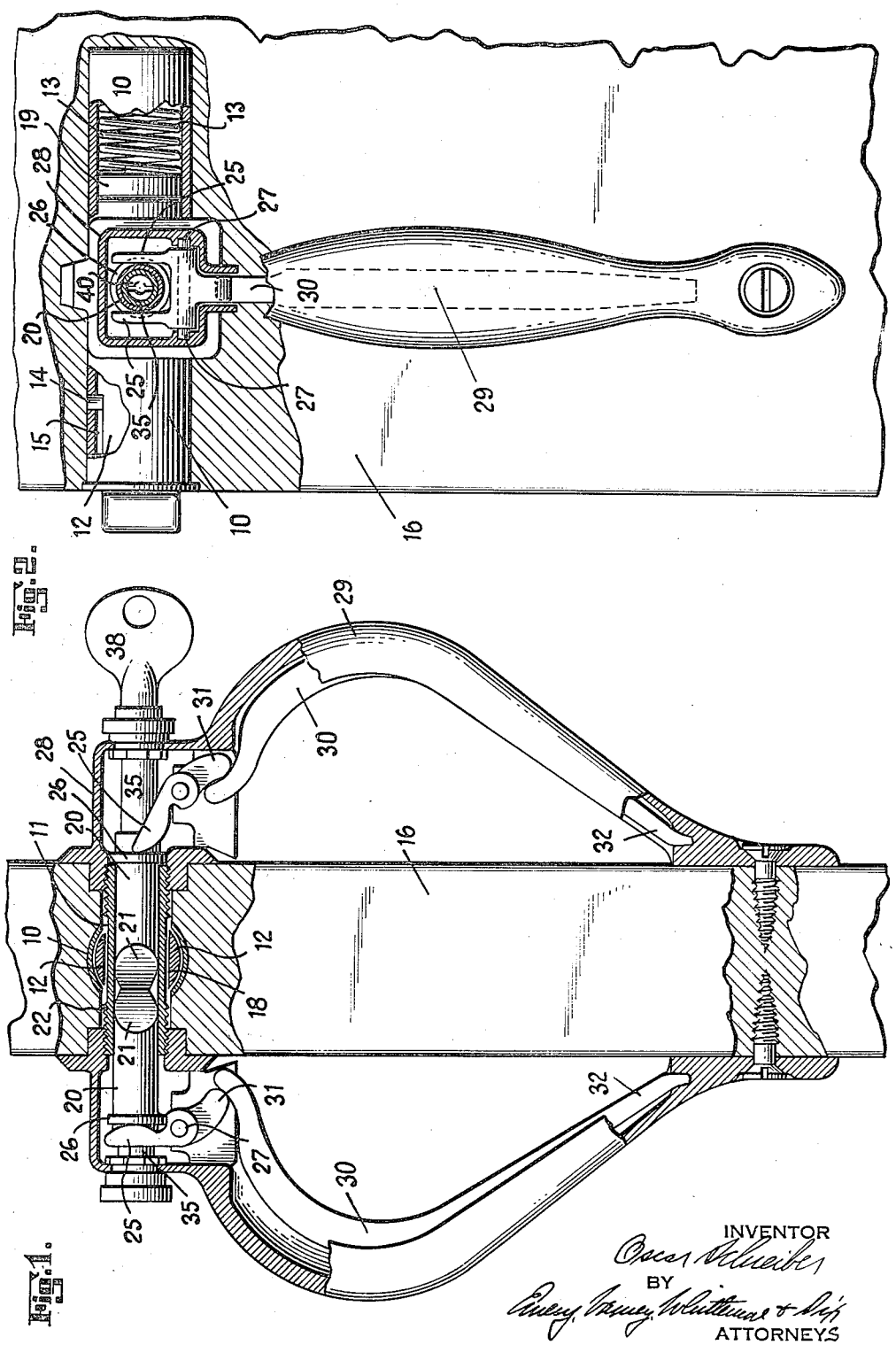
INVENTOR
Oscar Schreiber
BY
Avery, Varney, Whittemore & Hulbert
ATTORNEYS Sept. 7, 1937. O. SCHREIBER 2,092,225
LOCKING DEVICE
Filed May 19, 1936 2 Sheets-Sheet 2
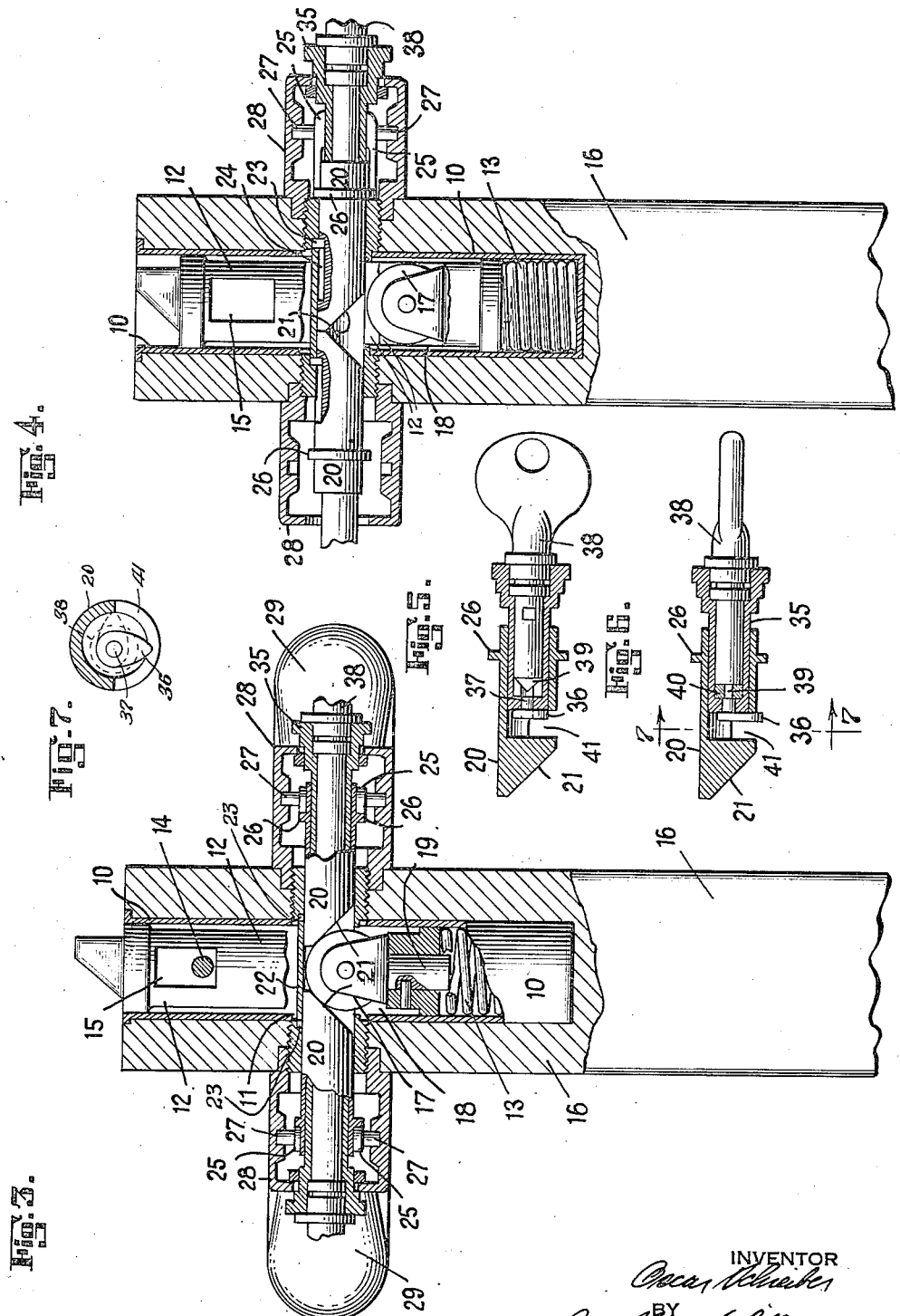

Patented Sept. 7, 1937

2,092,225

UNITED STATES PATENT OFFICE 2,092,225

LOCKING DEVICE

Oscar Schreiber, Wingdale, N. Y.

Application May 19, 1936, Serial No. 80,477

3 Claims. (Cl. 70—146)

This invention relates to locking devices.

Many locking devices require the mortising of the edge of the member, to which the device is applied, to form an opening in which the lock bolt and associated mechanism can be secured. This mortising operation usually results in cutting away a large portion of the edge of the member leaving only a very thin strip of material along the sides of the mortise opening. This both weakens the member at that point and adds to the difficulty of properly installing the locking device.

An object of this invention is to provide a locking device constructed and arranged to permit its being installed in a relatively small opening and thus eliminate the necessity of large mortise openings in the member to which the locking device is applied.

A further object is to provide a locking device possessing such advantageous features of construction and mode of operation as are hereinafter set forth.

These and other objects which will be apparent to those skilled in this particular art are accomplished by means of the invention hereinafter described, and illustrated in the accompanying drawings in which, Fig. 1 is a partial sectional view of a locking mechanism constructed in accordance with one embodiment of this invention, showing the same in place in a door;

Fig. 2 is a similar view looking from the right of Fig. 1;

Fig. 3 is a partial horizontal sectional view of the locking device shown in Figs. 1 and 2;

Fig. 4 is a horizontal sectional view similar to Fig. 3 showing the parts in bolt-retracting position; and Figs. 5 and 6 are sectional views showing one form of a key-controlled mechanism for preventing retraction of the lock bolt.

Fig. 7 is a partial sectional view on the lines 7—7 of Fig. 6.

In the illustrated embodiment of the invention, a casing 10, having slots 11 in opposite sides thereof, houses a lock bolt 12 slidably mounted within the casing 10 and spring pressed outwardly by a coil spring 13 located in the casing between the inner end thereof and the inner end of the bolt 12. The bolt is kept against ejection from the casing by a pin 14 mounted in the top of the casing and extending into a recess 15 in the top of the bolt.

The spring 13 normally presses the bolt outwardly into the position shown in Fig. 3 for engagement with an associated striker plate, not shown, in the usual manner. As shown in Figs. 3 and 4, the bolt 12 and spring 13 are housed within the relatively small diameter casing 10 and constitute therewith a unit which can be readily located within a hole of relatively small diameter formed in the edge of whatever member the locking device is applied to, such as the door 16 or the like.

The mechanism for retracting the bolt to the position shown in Fig. 4, to permit opening of the door 16, is adapted to engage an anti-friction member such as the roller 17 which is located in a slot 18 formed in the center of the bolt coinciding with the slots 11 in the opposite sides of the casing 10. As illustrated in Fig. 3, the roller 17 is mounted in a holder 19 pinned in the end of the bolt 12. A bolt-retracting plunger having a beveled face 21 is slidably mounted in a cylinder 22 extending transversely through the slots 11 of the bolt casing 10 and the slot 18 of the bolt 12. The sliding movement of the bolt-retracting plunger 20 is determined by a pin 23 in the cylinder 22 engaging a slot 24 in the surface of the plunger. It will be apparent that the plunger cylinder 22 locks the bolt casing 10 in place.

The bolt spring 13 normally presses the bolt outwardly into operative position shown in Fig. 3. In this position the roller 17 has forced the bolt-retracting plunger to the right, as shown in Fig. 3. The plunger is moved inwardly in the opposite direction into the bolt-retracting position shown in Figs. 1 and 4, by a plunger-operating yoke 25, the arms of which engage a collar 26 on the plunger 20. The yoke is pivotally mounted on a pin 27 supported at each end in sides of a housing 28. As illustrated, the housing is threaded to the end of the plunger housing 22, and forms the upper integral part of a door handle 29, the lower end of which is bolted or otherwise rigidly secured to the door 16.

The yoke 25 is adapted to be operated by a yoke-operating bar 30 engaging an arm 31 on the yoke. The bar 30 has its lower end 32 mounted in the handle 29.

It will be apparent that the means for actuating the bolt-retracting plunger 20 is housed within the door handle, so as to be protected thereby against injury or tampering. It will also be apparent that grasping the door handle to pull the door will automatically shift the bar 30 from the position indicated at the left of Fig. 1 to that shown on the right. This actuates the yoke 25 and drives the bolt-retracting plunger 20 inwardly from the position shown in Fig. 3 to that shown in Figs. 1 and 4. This forces the beveled face 21 of the plunger against the roller 17 of the bolt, and retracts the bolt as shown in Fig. 4. Release of the handle permits the bolt spring 13 to return all parts to the position shown in Fig. 3.

When it is desired to have a bolt-retracting mechanism on each side of the door 16, a duplicate bolt-retracting plunger and operating mechanism therefor is provided on each side of the door, as shown in Figs. 1, 3 and 4, but this mechanism need not be described in detail as it is merely a duplication of the mechanism above set forth.

Any form of suitable key-controlled mechanism can be employed to prevent operation of the bolt-retracting plunger 20, if desired. Figs. 1, 5 and 6 show one form of device suitable for this purpose. As illustrated, it consists of a cylinder 35 having a bolt locking arm 36 on a plug 37 rotatably mounted in the inner end thereof and rotatable from the inoperative position shown in Fig. 5 to the operative position shown in Fig. 6. Any suitable form of key 38 can be employed to rotate the locking arm 36 from one position to the other. As shown, the key 38 has a fin 39 on the end engaging in a slot 40 formed in the inner end of the plug. When the bolt-retracting plunger 20 is in the position shown in Fig. 3, the locking arm 36 can be turned by the key so as to project into a slot 41 formed in the adjacent face of the plunger 20. As shown in Fig. 1, the key barrel 35 is secured to the housing 28 so as to be relatively movable. Hence, when the locking arm is in the position shown in Fig. 6, the bolt 20 can not be moved inwardly into the bolt-retracting position.

The invention can be variously modified and adapted within the scope of the appended claims.

I claim:—

1. A door lock comprising a slotted slidably mounted spring-pressed bolt, a slotted housing therefor, a bolt retracting mechanism including a plunger housing extending transversely through the slotted bolt and bolt housing, a hollow bolt retracting plunger slidably mounted in said plunger housing, a handle, means associated with said handle for actuating said plunger to retract said bolt, and a locking mechanism mounted within said hollow plunger and operable to prevent movement thereof.

2. A door lock comprising a slotted slidably mounted spring-pressed bolt, a slotted housing therefor, a bolt retracting mechanism including a plunger housing extending transversely through the slotted bolt and bolt housing, a hollow bolt retracting plunger slidably mounted in said plunger housing, a handle, means associated with said handle for actuating said plunger to retract said bolt, and locking mechanism secured to said handle, extending into said plunger and operable to engage said plunger to prevent movement thereof.

3. A door lock comprising a slotted slidably mounted spring-pressed bolt, a slotted housing therefor, a bolt retracting mechanism including a plunger housing extending transversely through the slotted bolt and bolt housing, a hollow bolt retracting plunger slidably mounted in said plunger housing, a handle threaded to the end of said plunger housing, means for securing said handle against movement, and a locking mechanism secured to said handle and extending into said plunger and operable to engage said plunger to prevent movement thereof.

OSCAR SCHREIBER.